United States Patent [19]

Honlinger et al.

[11] 4,134,292

[45] Jan. 16, 1979

[54] TIRE TESTING APPARATUS

[75] Inventors: Herwig Hönlinger, Grob-Rohrheim; Friedrich Wenz, Seeheim, both of Fed. Rep. of Germany

[73] Assignee: Gebr. Hofmann G.m.b.H. KG, Maschinenfabrik, Darmstadt, Fed. Rep. of Germany

[21] Appl. No.: 878,712

[22] Filed: Feb. 15, 1978

[30] Foreign Application Priority Data

Mar. 5, 1977 [DE] Fed. Rep. of Germany ....... 2709682

[51] Int. Cl.² .......................................... G01M 17/02
[52] U.S. Cl. .................................................. 73/146
[58] Field of Search .......................................... 73/146

[56] References Cited

U.S. PATENT DOCUMENTS 3,927,561  12/1975  Schleimann ........................... 73/146
3,948,004  4/1976  Gruber ................................... 73/146

Primary Examiner—Donald O. Woodiel
Attorney, Agent, or Firm—Cushman, Darby & Cushman

[57] ABSTRACT

Apparatus and method for testing the nonuniformity of rotating bodies, and especially motor vehicle tires, in which the rotating body is pressed against a test drum and the radial and lateral reaction forces are measured at several locations on the drum. At each location a value proportional to the radial force is added to the lateral force to correct for the inductive disturbance of the lateral force measurement caused by the radial force. The corrected lateral force can then be used to determine the cone and angle effect.

4 Claims, 2 Drawing Figures

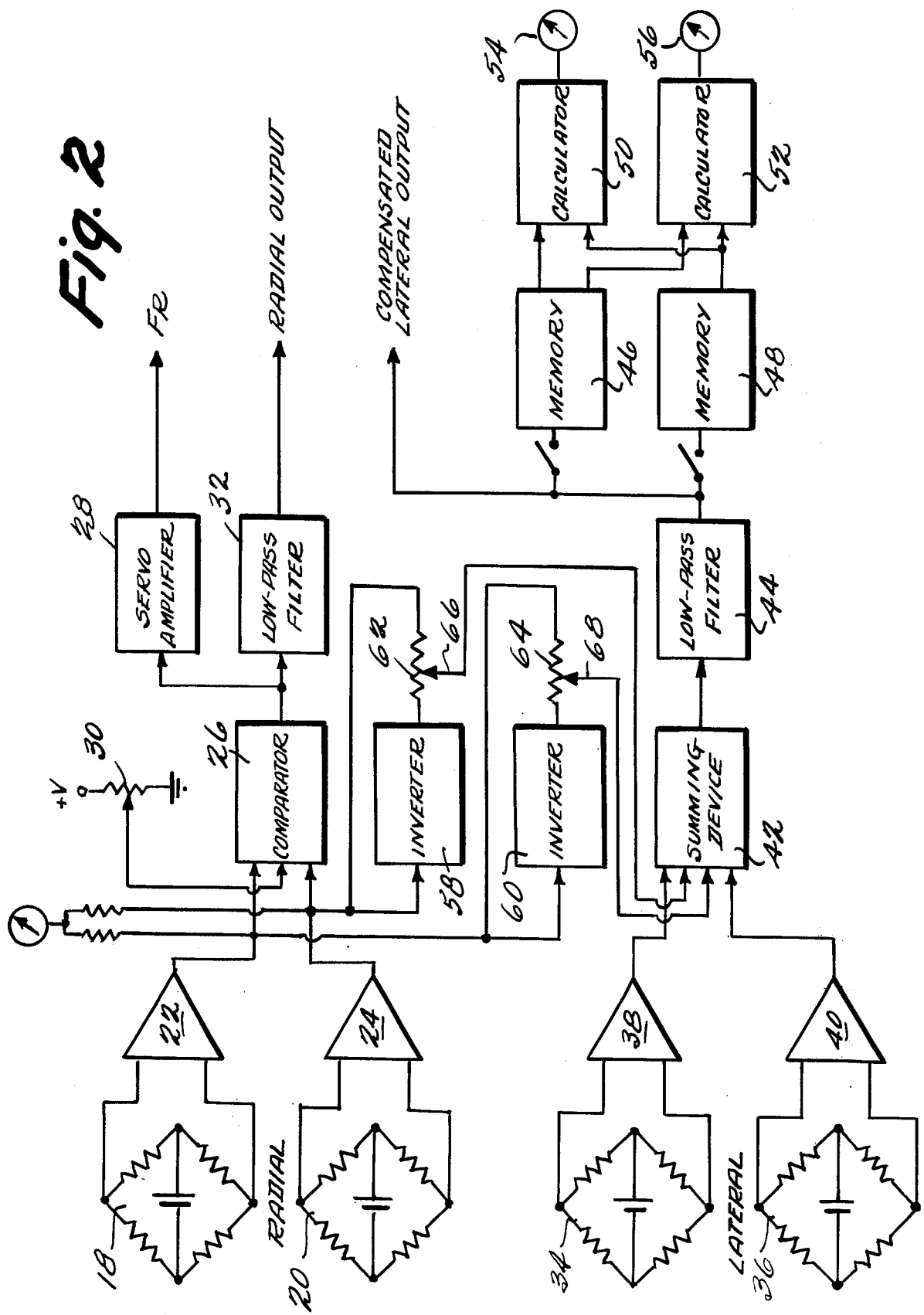

TIRE TESTING APPARATUS

The invention relates to procedure and apparatus for testing the nonuniformity of rotating bodies, and especially motor vehicle tires, in which the rotating body is pressed against a test drum and the reaction forces are measured and analyzed during rotation by means of detector-recorders.

Tire-testing instruments with which the radial force and lateral force fluctuations are obtained and which, furthermore, make it possible to determine the so-called cone and angle effect from the measured lateral forces are well known.

In order to be able to obtain the angle and cone effect, the lateral forces of the rotating body are measured in both directions of rotation, and the average lateral force values $F_1$ and $F_2$ from both directions of movement are stored.

The cone and angle effect is then calculated in a familiar manner:
from $$C_E = (F_1 + F_2)/2,$$

where $C_E$ is the cone effect, and from $$A_E = (F_1 - F_2)/2,$$

where $A_E$ is the angle effect.

In order to obtain the individual reaction forces in the lateral and radial directions, the test drum is supported on its axis by two two-component detector-recorders.

Because of the differing elastic behavior of the deformation elements of the detector-recorders and the placement of the individual strain-measuring strips on the deformation elements, an influencing of the force working in the radial direction on the device for measuring lateral force, and vice versa, cannot be avoided.

Furthermore, inductive disturbance distortions can arise through mechanical tolerances — through installing the detector-recorders not perfectly parallel to the test drum, for example — or through shifting of the axis from the test drum to the rotating body input. These distortions, however, are less important, since they can be compensated for by precise measurement and readjustments linked to that measurement.

On the other hand, the inductive disturbance distortions resulting from the detector-recorders themselves cannot be influenced subsequently.

The lateral force influence on the radial force measurement can be neglected in practice since the lateral forces are much smaller than the radial forces, and consequently their effects are very much less.

The situation is different with the static portion of the radial force, which is very large at the test drum as a result of the contact force of the rotating body, so that the influence of the radial force on the lateral force measurement cannot be excluded.

The resulting point of application of contact force is not precisely in the middle of the tire's tread surface, and also it changes from one tire being tested to the next, so that the detector-recorders installed on either side of the test drum will record radial forces of different magnitudes.

Since the inductive disturbance factor of each detector-recorder is also different, the correction magnitudes of the radial channel on the lateral channel of the two detector-recorders being used have different values, so that they have to be obtained separately.

In conventional testing machines, correcting the inductive disturbance by rotating the detector-recorders or placing sheet metal under them is familiar.

But these methods are disadvantageous in that the pressure cells have to be loosened and then tightened again for every adjustment process, so that exact location be means of pins or adjusting springs is not possible. Difficulties with the initial potential of the pressure cells can also arise as a result of loosening and tightening them several times. This adjusting process must also be repeated when a jaw space adjustment has to be carried out due to differing tire sizes.

Inductive disturbance distortions, caused by the detector-recorder itself, cannot be compensated for by these familiar methods. At the same time, the conventional compensation procedure is complicated and time-consuming.

The present invention provides a procedure for testng the nonuniformity of rotating bodies in which the lateral force component is not influenced by the radial force component.

This is ahcieved, in the invention, by adding in the static radial forces of the detector-recorders separately, each time using a proportionality factor of the radial force that is obtained.

The correction voltages are obtained by trial runs in an advantageous manner.

The apparatus for accomplishing this compensation in accordance with the invention preferably consists of two inverters assigned to the two detector-recorders into which the actual values of the radial forces are fed, and of rheostats assigned to the inverters from which the correction voltages are taken and stored, together with the lateral force, in a summing device.

The invention will now be explained in more detail, using one embodiment as an example.

FIG. 2 shows a block wiring diagram of the testing apparatus according to the invention.

Figure 1:
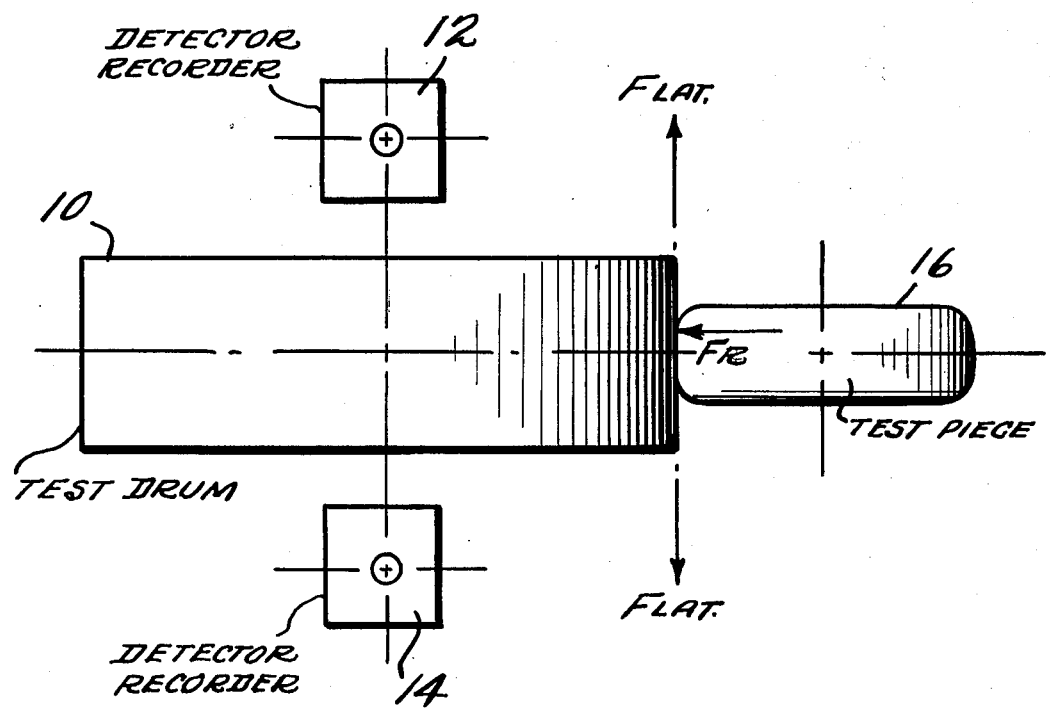
FIG. 1 shows the test stand in simplified form.

Test drum 10 is supported in a conventional manner and has right and left two-component detector-recorders numbered 12 and 14, respectively. Test piece 16 is also held by conventional means and pressed against test drum 10 by means of apparatus that is not shown in detail.

Test drum 10 is set in rotation, and, as a result, detector-records 12 and 14 record the reaction forces of test piece 16 in the radial and lateral directions.

Wheatstone bridge 18 (as shown in FIG. 2), for measuring the radial force, is a detector element of detector-recorder 12 and Wheatstone bridge 20 for measuring the radial force is a detector element of detector-recorder 14. The values measured are amplified in amplifiers 22 and 24 and added in comparator 26, with a comparison of the theoretical and actual values of the contact force being carried out simultaneously.

The output value of comparator 26 controls the contact force $F_R$ through servoamplifier 28. The theoretical contact force value can be pre-selected by rheostat 30.

The output of the comparator is also, at the same time, further processed — for example, for obtaining the peak values of the radial force fluctuations — through low-pass filter 32.

Wheatstone bridges 34 and 36 serve to measure the lateral forces and are also detector elements of detector-recorders 12 and 14, respectively.

The values measured are amplified in amplifiers 38 and 40, added in summing device 42 and supplied to low-pass filter 44. The output of low-pass filter 44, in the first place, indicates the lateral force fluctuations and, in the second place, is used to calculate the angle and/or cone effect, for which purpose a right and left movement, in the conventional manner, of test piece 16 is necessary. The individual, average lateral force values are stored in memories 46 and 48.

Subsequently, the cone effect and the angle effect can be calculated by devices 50 and 52 well known in the art and displayed on the indicators 54 and 56.

In order to compensate for the inductive disturbance of the radial channel working on the lateral channel of the detector-recorder being used, the actual values of the radial forces of Wheatstone bridges 18 and 20 are fed into the inverters 58 and 60, so that the actual values are available once positively and once negatively.

Both voltage values are applied to the adjustable resistances 62 and 64, at whose wiper terminals 66 and 68 the required compensation voltages, whose magnitudes are obtained by trial runs, can be obtained. The voltages that are obtained are then combined with the voltage that is proportional to the lateral force in summing device 42, so that the inductive disturbance of the radial channel is compensated for on the lateral channel.

What is claimed is:

1. Procedure for testing the nonuniformity of rotating bodies, and especially motor vehicle tires, comprising the steps of:
   pressing said rotating body against a test drum;
   measuring the radial and lateral reaction forces created by said pressing in at least two different locations on said drum; and
   adding values proportional to said radial forces measured at each of the measuring locations to the respective lateral reaction forces in order to compensate for the inductive disturbances of the lateral force measurements caused by said radial forces.

2. Procedure as in claim 1 wherein the factors by which said radial forces are multiplied to obtain said values are determined by trial runs.

3. Apparatus for testing the nonuniformity of rotating bodies, and especially motor vehicle tires, comprising:
   a test drum against which said rotating body is pressed;
   at least two detector-recorders positioned at different locations on said test drum for measuring the radial and lateral reaction forces, at each location, created by the interaction of said tire with said drum;
   at least two inverters, one connected to the radial outputs of each of said detector-recorders respectively;
   at least two rheostats, one associated with each of said inverters respectively, having one fixed terminal connected to the output of the associated inverter, a second fixed terminal connected to the radial output of the associated detector-recorder, and a wiper terminal upon which a correction value develops for compensating for the inductive disturbance of the lateral force measurements caused by said radial forces.

4. Apparatus as in claim 3 further comprising a summing means for combining said correction value with the associated lateral reaction for measurement.

* * * * *